(12) United States Patent
Nakagawa et al.

(10) Patent No.: US 12,104,326 B2
(45) Date of Patent: Oct. 1, 2024

(54) DECAY-RESISTANT PAPER

(71) Applicant: NIPPON BEET SUGAR MANUFACTURING., CO., LTD., Tokyo (JP)

(72) Inventors: Takuya Nakagawa, Obihiro (JP); Yasuomi Ota, Obihiro (JP); Hideaki Yamada, Tokyo (JP); Yoshiaki Okuhama; Seiichiro Nakao, Akashi (JP)

(73) Assignee: NIPPON BEET SUGAR MANUFACTURING., CO., LTD, Tokyo (JP)

( * ) Notice: Subject to any disclaimer, the term of this patent is extended or adjusted under 35 U.S.C. 154(b) by 0 days.

(21) Appl. No.: 17/640,429

(22) PCT Filed: Sep. 4, 2020

(86) PCT No.: PCT/JP2020/033646
§ 371 (c)(1),
(2) Date: Mar. 4, 2022

(87) PCT Pub. No.: WO2021/045205
PCT Pub. Date: Mar. 11, 2021

(65) Prior Publication Data
US 2022/0333311 A1 Oct. 20, 2022

(30) Foreign Application Priority Data
Sep. 6, 2019 (JP) .................................. 2019-163081

(51) Int. Cl.
*D21H 21/38* (2006.01)
*A01G 9/02* (2018.01)
(Continued)

(52) U.S. Cl.
CPC ............... *D21H 21/38* (2013.01); *A01G 9/02* (2013.01); *D21H 11/10* (2013.01); *D21H 17/14* (2013.01); *D21H 25/02* (2013.01); *D21H 25/04* (2013.01)

(58) Field of Classification Search
None
See application file for complete search history.

(56) References Cited

U.S. PATENT DOCUMENTS 4,610,761 A 9/1986 Eklund et al.
5,225,047 A * 7/1993 Graef .................... D21H 21/06
162/158

(Continued)

FOREIGN PATENT DOCUMENTS

CN 101292069 A 10/2008
CN 104822870 A 8/2015

(Continued)

OTHER PUBLICATIONS

Chinese Office Action for Chinese Application No. 202080062504.X, dated Sep. 5, 2022, with English translation.

(Continued)

*Primary Examiner* — Dennis R Cordray
(74) *Attorney, Agent, or Firm* — Birch, Stewart, Kolasch & Birch, LLP

(57) ABSTRACT

The invention is to provide a base paper for a raising seedling pot and a raising seedling pot produced from the base paper, wherein while the base paper maintains a sufficient strength during raising seedlings and planting in the field, it is degraded over time by soil microorganisms after transplanting in the field and is produced by using a crosslinking agent that does not contain formaldehyde, resulting in a reduced burden on the environment; the base paper for a raising seedling pot, wherein a citric acid crosslinking agent, as a crosslinking agent for cellulose, is used in order (Continued)

to block the hydroxy group of cellulose in paper through crosslinking; and the raising seedling pot produced by molding and processing the base paper.

3 Claims, 7 Drawing Sheets

(51) Int. Cl.
*D21H 11/10* (2006.01)
*D21H 17/14* (2006.01)
*D21H 25/02* (2006.01)
*D21H 25/04* (2006.01)

(56) References Cited

U.S. PATENT DOCUMENTS

| | | | |
|---|---|---|---|
| 5,470,434 A * | 11/1995 | Terasawa | D21H 17/07 162/134 |
| 5,718,728 A | 2/1998 | Arkens et al. | |
| 6,165,919 A | 12/2000 | Yang | |
| 2003/0145517 A1 | 8/2003 | Miller | |
| 2005/0072542 A1 | 4/2005 | Sears et al. | |
| 2008/0156857 A1 | 7/2008 | Johnston | |
| 2008/0264587 A1 | 10/2008 | Champ et al. | |
| 2015/0368864 A1 | 12/2015 | Seger et al. | |
| 2018/0230279 A1 | 8/2018 | Banzashi et al. | |

FOREIGN PATENT DOCUMENTS

| | | |
|---|---|---|
| EP | 0 651 088 A1 | 5/1995 |
| EP | 1 939 099 A1 | 7/2008 |
| JP | 50-33931 B | 11/1975 |
| JP | 59-100793 A | 6/1984 |
| JP | 60-501317 A | 8/1985 |
| JP | 2-23640 B2 | 5/1990 |
| JP | 2001-508139 A | 6/2001 |
| JP | 2006-342452 A | 12/2006 |
| JP | 2007-527472 A | 9/2007 |
| JP | 2016-510366 A | 4/2016 |
| KR | 10-2018-0037191 A | 4/2018 |

OTHER PUBLICATIONS

Nagano et al., "Poval," Polymer Publishing Association (Apr. 25, 1984), pp. 337-342.
Written Opinion of the International Searching Authority mailed Oct. 27, 2020, in PCT/JP2020/033646.
Chinese Office Action for Chinese Application No. 202080062504. X, dated Apr. 22, 2023, with an English translation.
Extended European Search Report for European Application No. 20861747.2, dated Aug. 2, 2023.
Widsten et al., "Citric acid crosslinking of paper products for improved high-humidity performance," Carbohydrate Polymers, vol. 101, 2014, pp. 998-1004.
Korean Office Action for Korean Application No. 10-2022-7009819, dated Jul. 1, 2024, with English translation.

* cited by examiner

DECAY-RESISTANT PAPER

TECHNICAL FIELD

The present invention relates to a paper that can withstand decay for a certain period of time, i.e., a decay-resistant paper that can be used for, for example, agricultural materials, fishery materials, and building materials.

BACKGROUND ART

Conventionally, a seedling transplanting cultivation method has been widely put into practical use, wherein a plant is cultivated using a paper pot processed to have a quadrangular prism shape or a hexagonal prism shape. Specifically, this cultivation method involves charging culture soil into a quadrangular or hexagonal prism-shaped pot made of paper, seeding, growing seedlings under irrigation control, planting the thus-grown seedlings contained in the pot (i.e., seedlings in the pot) in the field, and cultivating the seedlings. This technique is characterized by easy planting in the field, labor savings, and high survival rate of planting because of no damage to the seedlings.

Since the paper for the pot used in the aforementioned seedling transplanting cultivation method (hereinafter the paper may be referred to as "base paper for a raising seedling pot") is made of wood fiber, the paper strength decreases upon wetting. In particular, when the paper is used for agriculture, the paper is easily degraded by soil microorganisms.

The main characteristic features required for a base paper for a raising seedling pot are, for example, (1) having paper strength upon drying to such an extent as to withstand mechanical processing (e.g., bending and pulling) during production of a pot and (2) having resistance to degradation by microorganisms during raising seedlings (i.e., decay resistance) and having paper strength upon wetting so as to withstand mechanical or artificial handling during planting in the field.

Various methods for processing a base paper for a raising seedling pot have been proposed for achieving the aforementioned requirements while taking advantage of paper characteristics.

For example, Patent Document 1 discloses a method for producing a synthetic fiber paper exhibiting enhanced burial strength by mixing of wood pulp with polyvinyl alcohol fiber and thermal treatment of the resultant mixture.

Patent Documents 2 and 3 disclose a method for providing a paper with strength to withstand production of a pot, and decay resistance to such an extent as to withstand raising seedling conditions and to naturally degrade after transplanting, wherein the hydroxyl group of cellulose in paper is chemically blocked through crosslinking by using a formaldehyde-based agent which is an N-substituted urea derivative such as dimethyldihydroxyethylene urea (DMDHEU).

Non-Patent Document 1 discloses a method for preventing degradation of a paper or paperboard by sizing the surface of the paper or paperboard with a sizing liquid containing a polyvinyl alcohol resin and a water-resistant agent such as a urea formalin resin, a trimethylolmelamine resin, or glyoxal.

PRIOR ART DOCUMENTS

Patent Document 1: JP 1975-33931 B
Patent Document 2: JP 1984-100793 A
Patent Document 3: JP 1990-023640 B
Patent Document 4: JP 2001-508139 A Non-Patent Documents Non-Patent Document 1: "Poval," co-authored by Koichi Nagano, et al., Polymer Publishing Association (Apr. 25, 1984), pp. 337-342

SUMMARY OF THE INVENTION

Problems to be Solved by the Invention

According to the method proposed in Patent Document 1, a large amount of polyvinyl alcohol fiber mixed with paper is required for increasing the physical strength (e.g., decay resistance) of the paper, which may result in loss of the properties of the paper. According to the method disclosed in Non-Patent Document 1, the resultant paper may be provided with insufficient decay resistance through sizing. According to the method disclosed in Patent Documents 2 and 3, the paper can be provided with sufficient decay resistance, but DMDHEU (i.e., formaldehyde-based agent) may contain a very small amount of formaldehyde, which requires consideration of impact on the environment.

There has also been disclosed a technique for improving a wetting performance (e.g., wrinkle recovery or strength) by using polycarboxylic acid as a crosslinking agent in place of a formaldehyde-based agent in order to block the hydroxyl group of cellulosic fiber through crosslinking (Patent Document 4). However, it has not yet been disclosed that such a technique can impart decay resistance (i.e., important requirement for paper) to a base paper for a raising seedling pot used in the field of agriculture.

An object of the present invention is to provide a base paper for a raising seedling pot and a raising seedling pot produced from the base paper, wherein the base paper exhibits sufficient paper strength upon drying and wetting for maintaining a sufficient strength during production of a raising seedling pot and planting in the field, exhibits resistance to degradation by microorganisms during raising seedlings (i.e., decay resistance), which is a specific performance required for a base paper for a raising seedling pot, and is produced by using an agent (crosslinking agent) that does not generate free formaldehyde (which may cause a concern about the environment), resulting in a reduced burden on the environment.

Means for Solving the Problems

In order to achieve the aforementioned object, the present inventors have conducted extensive studies, and as result have found that when the hydroxy group of cellulose fiber is blocked by using a polycarboxylic acid crosslinking agent that does not generate free formaldehyde in place of a conventional formaldehyde-based agent (DMDHEU), the resultant base paper for a raising seedling pot can be provided with required decay resistance and exhibits a reduced burden on the environment.

Furthermore, the present inventors have conducted studies on conditions for reaction with a polycarboxylic acid crosslinking agent in more detail, and have found that a paper can be provided with desired decay resistance corresponding to various conditions. The present invention has been accomplished on the basis of these findings.

Accordingly, the present invention provides the following embodiments (1) to (21).

(1) A decay-resistant paper comprising a cellulose fiber-containing paper and a carboxylic acid crosslinking agent, characterized in that the cellulose fiber is at least partially bonded to the carboxylic acid crosslinking agent.

(2) The decay-resistant paper according to (1), characterized in that the carboxylic acid crosslinking agent is at least one compound selected from the group consisting of dicarboxylic acids, polycarboxylic acids, and salts of these.

(3) The decay-resistant paper according to (1) or (2), characterized in that the carboxylic acid crosslinking agent is at least one compound selected from the group consisting of citric acid, butanetetracarboxylic acid, iminodisuccinic acid, maleic acid, fumaric acid, oxalic acid, malonic acid, succinic acid, adipic acid, and salts of these.

(4) The decay-resistant paper according to any one of (1) to (3), characterized in that the carboxylic acid crosslinking agent is contained in an amount of 0.3 to 20.0% by mass relative to the dry mass of the paper.

(5) The decay-resistant paper according to any one of (1) to (4), characterized by further comprising at least one crosslinking catalyst selected from the group consisting of sodium hypophosphite, potassium hypophosphite, and disodium hydrogenphosphate.

(6) The decay-resistant paper according to (5), characterized in that the crosslinking catalyst is contained in an amount of 0.1 to 30% by mass relative to the mass of the carboxylic acid crosslinking agent.

(7) A base paper for a raising seedling pot characterized by comprising the decay-resistant paper according to any one of (1) to (6).

(8) A raising seedling pot characterized by being produced from the base paper for a raising seedling pot according to (7).

(9) A method for producing a decay-resistant paper, the method being characterized by comprising:
  a step of applying a processing liquid containing a carboxylic acid crosslinking agent to a cellulose fiber-containing paper; and
  a step of thermally treating the processing liquid-applied paper.

(10) The method for producing a decay-resistant paper according to (9), characterized in that the carboxylic acid crosslinking agent is at least one compound selected from the group consisting of dicarboxylic acids, polycarboxylic acids, and salts of these.

(11) The method for producing a decay-resistant paper according to (9) or (10), characterized in that the carboxylic acid crosslinking agent is at least one compound selected from the group consisting of citric acid, butanetetracarboxylic acid, iminodisuccinic acid, maleic acid, fumaric acid, oxalic acid, malonic acid, succinic acid, adipic acid, and salts of these.

(12) The method for producing a decay-resistant paper according to any one of (9) to (11), characterized in that the processing liquid contains the carboxylic acid crosslinking agent at a concentration of 1.0 to 20.0% by mass.

(13) The method for producing a decay-resistant paper according to any one of (9) to (12), characterized in that the thermal treatment is performed in an atmosphere having a temperature of 100 to 300° C.

(14) The method for producing a decay-resistant paper according to any one of (9) to (12), characterized in that the thermal treatment is performed in an atmosphere having a temperature of 150 to 220° C.

(15) The method for producing a decay-resistant paper according to any one of (9) to (12), characterized in that the thermal treatment is performed by contact heating with a heating roll and/or a heating plate.

(16) The method for producing a decay-resistant paper according to (15), characterized in that the thermal treatment is performed at a temperature of 150 to 250° C.

(17) The method for producing a decay-resistant paper according to (15), characterized in that the thermal treatment is performed at a temperature of 190 to 220° C.

(18) The method for producing a decay-resistant paper according to any one of (9) to (17), characterized in that the processing liquid further contains at least one crosslinking catalyst selected from the group consisting of potassium hypophosphite and disodium hydrogenphosphate.

(19) The method for producing a decay-resistant paper according to (18), characterized in that the processing liquid contains the crosslinking catalyst in an amount of 0.1 to 30% by mass relative to the mass of the carboxylic acid crosslinking agent.

(20) The method for producing a decay-resistant paper according to any one of (9) to (19), characterized in that the processing liquid has a pH of less than 4.

(21) The method for producing a decay-resistant paper according to any one of (9) to (20), wherein the decay-resistant paper is a base paper for a raising seedling pot.

(22) A method for producing a raising seedling pot, the method comprising a use of a base paper for a raising seedling pot produced by the method according to (21).

Effects of the Invention

The present invention can provide a decay-resistant paper exhibiting a reduced burden on the environment by using a carboxylic acid crosslinking agent as a crosslinking agent for cellulose in place of a formaldehyde-based agent (DMD-HEU), as well as a base paper for a raising seedling pot and a raising seedling pot which maintain a sufficient strength during raising seedlings and planting in the field.

MODES FOR CARRYING OUT THE INVENTION

Figure 1:
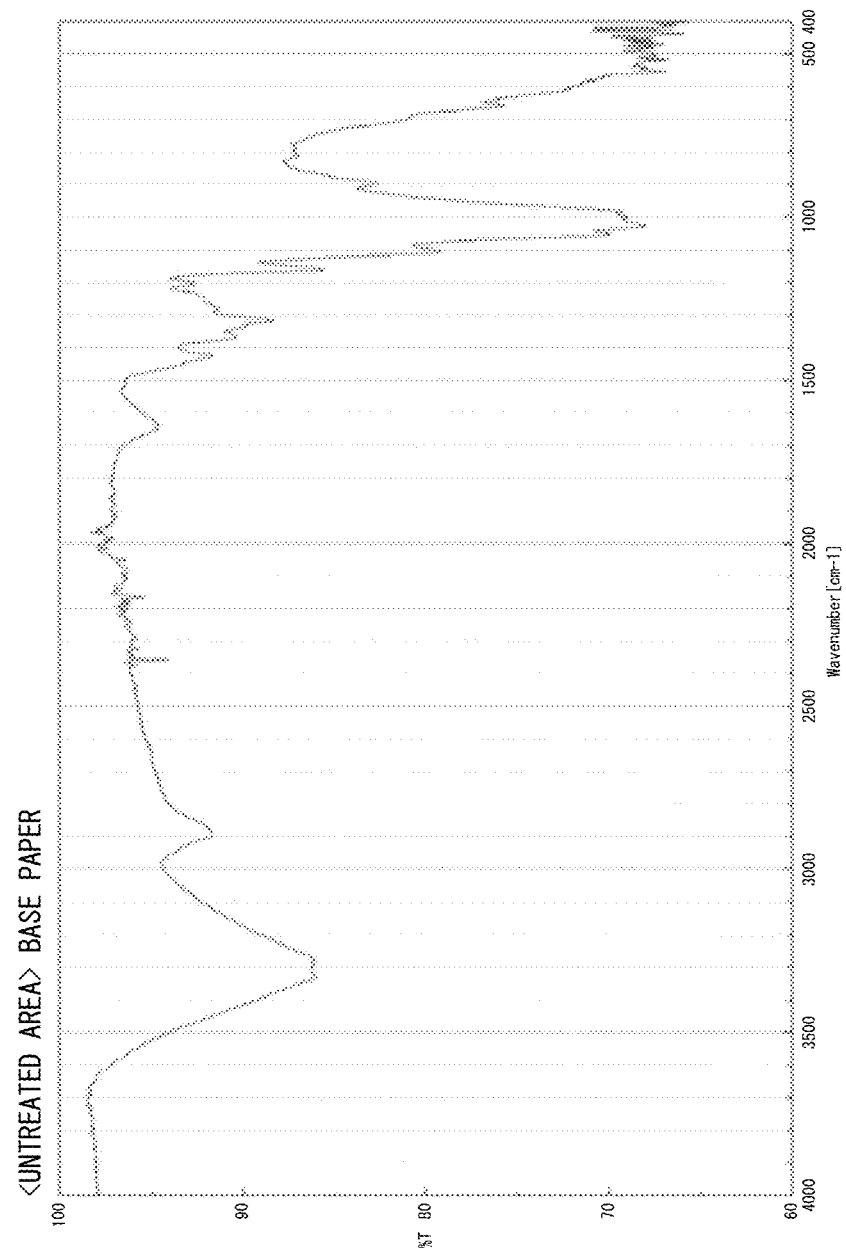
FIG. 1 shows the results of FT-IR spectroscopy performed on <untreated area>.

In general, a raising seedling pot is produced from a wood fiber-containing paper, and thus the paper strength decreases upon wetting. In addition, since the pot is charged with culture soil during raising seedlings, the pot is degraded by microorganisms contained in the culture soil. This degradation generally proceeds through hydrolysis of cellulose forming the wood fiber of paper by cellulase (cellulose catabolic enzyme) produced from soil microorganisms.

The present inventors have conceived that the degradation reaction of cellulose by cellulase is prevented through blocking of the hydroxy group of cellulose with a crosslinking agent that does not generate free formaldehyde; specifically, the paper is provided with decay resistance by treatment through reaction between the cellulose forming the paper and a carboxylic acid crosslinking agent. The present invention has been accomplished on the basis of this conception.

The present invention will next be described in detail.

[Decay-Resistant Paper]

The present invention is directed to a decay-resistant paper comprising a cellulose fiber-containing paper and a carboxylic acid crosslinking agent, characterized in that the cellulose fiber is at least partially bonded to the carboxylic acid crosslinking agent. Thus, the decay-resistant paper of the present invention may contain a carboxylic acid crosslinking agent that is not crosslinked with the cellulose fiber.

<Paper>

No particular limitation is imposed on the type of raw material pulp or the amount of cellulose fiber contained in the paper used in the present invention; i.e., the paper (may be referred to as "base paper") serving as a raw material of the decay-resistant paper, so long as the base paper contains cellulose fiber as a main component. For example, the base paper may be a paper containing pulp that is used as a common papermaking material. More specific examples of the material include chemical pulps, such as kraft pulp (KP), sulfite pulp (SP), and soda pulp (AP); semichemical pulps, such as semichemical pulp (SCP) and chemiground wood pulp (CGP); mechanical pulps, such as ground pulp (GP), thermomechanical pulp (TMP, BCTMP), and refiner groundwood pulp (RGP); non-wood fiber pulps produced from, for example, paper mulberry, paper bush, hemp, and kenaf; and deinking pulps produced from used paper. These may be used alone or in combination of two or more species. In particular, the base paper used is preferably one formed from unbleached pulp. The wood serving as a raw material of pulp fiber may be coniferous wood or hardwood, or a mixture thereof. The base paper may contain, besides any of these, chemical fiber such as polyethylene, polyester, vinylon, rayon, synthetic pulp, or polylactate.

If necessary, the paper used in the present invention may contain any auxiliary agent generally used for papermaking, such as a binder, a filler, a paper strength enhancer, a sizing agent, a yield improver, or a preservative. The paper may be subjected to sizing treatment with, for example, starch or polyvinyl alcohol, so long as the below-described reaction with a carboxylic acid crosslinking agent is not inhibited. Alternatively, the paper may be provided with a coating layer or resin coating layer containing an inorganic pigment as a main component.

No particular limitation is imposed on the basis weight of the paper used in the present invention. The basis weight may be, for example, 20 to 200 g/m$^2$, or, for example, 30 to 100 g/m$^2$, or 40 to 60 g/m$^2$.

<Carboxylic Acid Crosslinking Agent>

The carboxylic acid crosslinking agent used in the present invention may be a carboxylic acid crosslinking agent such as a dicarboxylic acid or a polycarboxylic acid. Examples of the carboxylic acid crosslinking agent include citric acid, tartaric acid, malic acid, oxalic acid, malonic acid, succinic acid, glutaric acid, adipic acid, fumaric acid, maleic acid, citraconic acid, itaconic acid, tartrate monosuccinic acid, iminodisuccinic acid, butanetetracarboxylic acid, polyacrylic acid, polymethacrylic acid, polymaleic acid, polymethyl vinyl ether-co-maleate copolymer, polymethyl vinyl ether-co-itaconate copolymer, acrylic acid polymer, maleic acid polymer, and salts thereof.

Examples of particularly preferred carboxylic acid crosslinking agents include citric acid, butanetetracarboxylic acid, iminodisuccinic acid, maleic acid, fumaric acid, oxalic acid, malonic acid, succinic acid, adipic acid, and salts thereof.

The amount of the aforementioned carboxylic acid crosslinking agent to be incorporated; i.e., the amount of the carboxylic acid crosslinking agent used (applied) for the paper to be treated varies depending on, for example, the type of the paper (e.g., pulp type, cellulose content, or basis weight). The amount of the carboxylic acid crosslinking agent can be appropriately adjusted so that a raising seedling pot produced from the decay-resistant paper of the present invention can maintain a sufficient strength during raising seedlings and planting using the pot. For example, the amount of the carboxylic acid crosslinking agent used (applied) may be 0.3 to 25.0% by mass relative to 100% by mass of the dry mass of the paper to be treated. In a preferred embodiment, the carboxylic acid crosslinking agent can be used (applied) in an amount of 0.3 to 20.0% by mass, for example, 2.4 to 20.0% by mass, 2.4 to 17.0% by mass, 7.5 to 20.0% by mass, 7.5 to 17.0% by mass, or 10.0 to 17.0% by mass. In a more preferred embodiment, the carboxylic acid crosslinking agent can be used (applied) in an amount of 13.0 to 17.0% by mass. When the amount of the carboxylic acid crosslinking agent used (applied) is adjusted to 0.3% by mass or more, the resultant paper can be provided with decay resistance; i.e., the paper can be prevented from being broken during raising seedlings or transplanting.

<Crosslinking Catalyst>

In the present invention, the carboxylic acid crosslinking agent may be used in combination with a crosslinking catalyst for the purpose of promoting reaction (i.e., allowing reaction to proceed within a short period of time).

Examples of the crosslinking catalyst include alkali metal hypophosphites such as sodium hypophosphite and potassium hypophosphite, phosphates, alkali metal phosphites, alkali metal polyphosphates, alkali metal dihydrogenphosphates such as disodium hydrogenphosphate, alkali metal phosphates, alkali metal hydrogenphosphates, polyphosphoric acid, hypophosphorous acid, phosphoric acid, phosphates such as allylphosphinic acid, metal salts such as magnesium chloride, zinc chloride, aluminum chloride, magnesium sulfate, zinc sulfate, aluminum sulfate, magnesium nitrate, zinc nitrate, magnesium borofluoride, and zinc borofluoride, ammonium salts such as ammonium chloride, ammonium sulfate, and ammonium phosphate, and organic amine salts such as monoethanolamine hydrochloride. These crosslinking catalysts may be used alone or in combination of two or more species.

The amount of the aforementioned crosslinking catalyst used cannot be univocally determined, since various effects are obtained depending on, for example, the type of the carboxylic acid crosslinking agent used, the reactivity of the catalyst to the carboxylic acid crosslinking agent, or the type of the catalyst. Generally, the amount of the crosslinking catalyst used may be 0.1 to 40% by mass relative to the mass (100% by mass) of the carboxylic acid crosslinking agent. In a preferred embodiment, the amount of the crosslinking catalyst may be, for example, 10 to 30% by mass or 15 to 25% by mass.

[Production Method for Decay-Resistant Paper]

In the decay-resistant paper of the present invention, the treatment for bonding the aforementioned carboxylic acid crosslinking agent to the cellulose fiber contained in the aforementioned paper may be performed by, for example, applying the carboxylic acid crosslinking agent to the paper, and then heating the paper for allowing reaction of the carboxylic acid crosslinking agent to proceed.

The present invention is also directed to a production method for the decay-resistant paper. The production method is characterized by including a step of preparing a processing liquid containing the aforementioned carboxylic acid crosslinking agent and, if desired, the aforementioned crosslinking catalyst, and applying the processing liquid to at least a portion of a target paper (cellulose fiber-containing paper), and a step of thermally treating the processing liquid-applied paper.

<Step of Papermaking of Base Paper>

In the present embodiment, the base paper is preferably produced by the papermaking method. The use of the papermaking method can facilitate mixing of plural types of fibers.

The papermaking method generally involves mixing short fibers serving as a raw material and forming the mixture into a sheet. The papermaking method is roughly divided into a dry method and a wet method. Specifically, the dry method involves dry blending of short fibers, and then accumulation of the fibers on a net by using a stream of air, to thereby form a sheet. The sheet may be formed by using, for example, a stream of water. Meanwhile, the wet method involves dispersion and mixing of short fibers in a liquid medium, and then accumulation of the fibers on a net, to thereby form a sheet. Of these methods, preferably selected is a wet papermaking method using water as a medium.

The wet papermaking method generally involves feeding of an aqueous slurry containing short fibers to a paper machine, dispersion of the short fibers, and then dehydration, squeezing, and drying, to thereby roll up a paper. Examples of the usable paper machine include a fourdrinier paper machine, a cylinder paper machine, an inclined paper machine, and a combination of these (i.e., a combination paper machine).

The production of the base paper by the papermaking method requires a drying step, since pulp fiber contains water. Generally, the drying step is performed at a temperature of preferably 100° C. or higher, more preferably about 120 to 140° C. The drying step involves the use of a dryer, for example, a multi-cylinder dryer, a Yankee dryer, an after-dryer, a hand dryer, or an infrared dryer.

<Step of Applying Processing Liquid>

This step may involve the use of a processing liquid prepared by dilution and formulation of the aforementioned carboxylic acid crosslinking agent and, if desired, the aforementioned crosslinking catalyst with water so as to achieve an appropriate concentration. The processing liquid may contain an additional additive that can be commonly used for paper processing, so long as the effects of the present invention are not impaired.

The amount of the carboxylic acid crosslinking agent contained in the aforementioned processing liquid may be appropriately determined in consideration of, for example, the amount of the liquid applied to a paper. The amount of the carboxylic acid crosslinking agent may be, for example, 0.3 to 25.0% by mass. In a preferred embodiment, the amount of the carboxylic acid crosslinking agent contained in the processing liquid may be 1.0 to 20.0% by mass, 5.0 to 20.0% by mass, 7.5 to 15.0% by mass, 10.0 to 15.0% by mass, or 12.5 to 15.0% by mass.

When the crosslinking catalyst is used, the amount thereof may be 0.1 to 40% by mass, for example, 10 to 30% by mass or 15 to 25% by mass relative to the mass (100% by mass) of the carboxylic acid crosslinking agent.

The solvent of the processing liquid, which can dissolve the carboxylic acid crosslinking agent or the crosslinking catalyst, may be appropriately determined in consideration of the applicability to a paper or handleability in the respective steps. For example, water can be used as the solvent.

Preferably, a processing liquid having an acidic pH (less than 7) is applied to a paper. For example, a processing liquid having a pH of 6 or less, 5 or less, or 4 or less can be used. Alternatively, a processing liquid having a pH of less than 4 can be used.

No particular limitation is imposed on the method for applying the aforementioned processing liquid to a paper, so long as a predetermined amount of the carboxylic acid crosslinking agent can be adhered to the paper. Preferably, there can be used a method for uniformly adhering a predetermined amount of the carboxylic acid crosslinking agent to the entire paper; for example, a method of exposing the paper to the vapor of the processing liquid, a method of immersing the paper in the processing liquid, or a method of applying or spraying the processing liquid to the paper. The immersing or applying method may involve the use of any known coating or impregnating apparatus, such as a roller coater, a bar coater, a doctor coater, a blade coater, or a curtain coater. When industrial treatment is performed in the papermaking step, the processing liquid may be applied to the paper in a size press step or a gate-rolling step. When the processing liquid is applied in the papermaking step, the processing liquid can be dried through the drying step.

<Step of Thermal Treatment>

After application of the processing liquid to the paper, the paper is subjected to thermal treatment. The thermal treatment is performed for allowing reaction of the above-applied carboxylic acid crosslinking agent to proceed, and for completing the reaction.

No particular limitation is imposed on the usable thermal treatment method, so long as it is a heating method that is commonly performed for paper. The thermal treatment method may be a contact heating method or a non-contact heating method. For example, the thermal treatment is performed by a contact heating method wherein one surface of the aforementioned paper is brought into contact with, for example, the cylinder surface (heating roll or heating plate) of a cylinder dryer heated at a predetermined temperature; a non-contact heating method wherein the paper is exposed to a high-temperature atmosphere in, for example, a circulating hot air dryer for a predetermined period of time; or a method of treatment with a far infrared dryer.

The thermal treatment temperature, which varies depending on the thermal treatment method, may be, for example, 30 to 300° C., and is preferably 100 to 250° C., more preferably 150 to 220° C. Alternatively, the thermal treatment temperature may be 190 to 220° C. The thermal treatment time may vary depending on the thermal treatment method. In the case of non-contact heating with a circulating hot air dryer, etc., the thermal treatment time is, for example, 30 seconds to 60 minutes, more preferably 1 to 15 minutes. In the case of contact heating with, for example, the heating roll or heating plate of a cylinder dryer, etc., the thermal treatment time is, for example, 0.5 seconds to 30 minutes, more preferably 1 second to 3 minutes.

After application of the processing liquid to the paper, the paper may be preliminarily dried as appropriate before the thermal treatment, to thereby adjust the water content of the paper. The water content adjustment (preliminary drying) is desirably performed under such conditions that the reaction of the carboxylic acid crosslinking agent does not proceed virtually. The water content adjustment may be performed with any known drying means, such as a short loop dryer, a continuous tumble dryer, a tenter dryer, or a drum dryer. The adjustment of the water content of the paper is not essential in this stage, and may be performed in the base paper production stage (papermaking step).

As described above, the decay-resistant paper of the present invention is formed through at least partial bonding between the cellulose fiber and the carboxylic acid crosslinking agent.

This bonding is attributed to formation of an ester bond between the hydroxy group of the cellulose fiber and the carboxylic acid crosslinking agent. The formation of the ester bond can be determined by measurement of infrared absorption spectra wherein the characteristic absorption peak of the ester bond appears strongly.

Specifically, when the peak attributed to the C=O stretching vibration of an ester is observed at around 1,730 $cm^{-1}$ in infrared absorption spectra, the introduction of this bond structure is determined.

Alternatively, the formation of the ester bond can be determined through observation of the low-field shift of the signal of hydrogen adjacent to the ester by nuclear magnetic resonance (NMR) spectroscopy, as compared with an untreated (non-crosslinked) case.

[Base Paper for Raising Seedling Pot and Raising Seedling Pot]

The decay-resistant paper of the present invention can be suitably used as a base paper for a raising seedling pot. Thus, the present invention is also directed to a base paper for a raising seedling pot composed of the decay-resistant paper, and a raising seedling pot formed of the base paper.

EXAMPLES

The present invention will next be described in more detail by way of Examples. In Examples, the performances of test samples were measured and evaluated by methods described below.

In the evaluations described below, a higher strength value indicates more reduced degradation of cellulose contained in a sample.

(1) Tear Strength (Processed Paper Prepared in Examples 4, 6, and 8):

The tear strength was measured in a paper length direction (longitudinal direction; Examples 4, 6, and 8) and in a paper width direction (lateral direction; Examples 6 and 8) according to JIS P8116:2000 "Paper—Determination of tearing resistance—Elmendorf tearing tester method." The dimensions of a sample used in this test were adjusted to 75 mm×63 mm. The measurement was repeated four times, and the average was calculated.

(2) Folding Strength (Processed Paper Prepared in Examples 4, 6, and 8):

The folding endurance test was performed (folding: eight times) in a paper length direction (longitudinal direction; Examples 4, 6, and 8) and in a paper width direction (lateral direction; Examples 6 and 8) according to JIS P-8115:2001 "Paper and board—Determination of folding endurance—MIT method." The dimensions of a sample used in this test were adjusted to 15 mm×100 mm.

(3) Dry Tensile Strength and Wet Tensile Strength (Processed Paper Prepared in Examples 4, 6, and 8):

Each tensile strength was measured with a constant rate elongation tensile tester (Autograph Tensile Tester, available from SHIMADZU CORPORATION) in a paper length direction (longitudinal direction; Examples 4, 6, and 8) and in a paper width direction (lateral direction; Examples 6 and 8) by the method according to JIS P8113:1998 "Paper and board—Determination of tensile properties—Part 2: Constant rate of elongation method." The dimensions of a sample were adjusted to 15 mm×100 mm. The sample was elongated with a chuck span of 50 mm at a tensile rate of 10 mm/min, to thereby measure a strength at break. The measurement was repeated eight times, and the average (and the standard deviation) were calculated.

<Dry Tensile Strength: Conditions for Sample Humidity Control>

The humidity of a sample was controlled by the method specified by JIS P8111:1998 (Paper, board and pulps—Standard atmosphere for conditioning and testing: 23° C.±1° C., (50±2)% r. h.), and the resultant sample was used for the test.

<Wet Tensile Strength: Conditions for Sample Humidity Control>

The humidity of a sample was controlled by the method specified by JIS P8111:1998 (see above), and then the sample was immersed in water (room temperature: 20° C.±5° C.) for 24 hours. The resultant sample was used for the test.

(4) Wet Tensile Strength (Standard) [Referential Example 1 (Processed Paper Prepared in Example 1), Referential Example 2 (Processed Paper Prepared in Example 4), Referential Example 4 (Processed Paper Prepared in Example 6), Referential Example 5 (Processed Paper Prepared in Example 8)] and Post-Enzyme Treatment Tensile Strength [Example 2 (Processed Paper Prepared in Example 1), Example 5 (Processed Paper Prepared in Example 4), Example 7 (Processed Paper Prepared in Example 6), Example 9 (Processed Paper Prepared in Example 8)]

Each tensile strength was measured with a constant rate elongation tensile tester (Autograph Tensile Tester, available from SHIMADZU CORPORATION) in a paper length direction (longitudinal direction; Referential Examples 1, 2, 4, and 5 and Examples 2, 5, 7, and 9) and in a paper width direction (lateral direction; Referential Examples 4 and 5 and Examples 7 and 9) by the method according to JIS P8113:1998 "Paper and board—Determination of tensile properties—Part 2: Constant rate of elongation method." The dimensions of a sample were adjusted to 30 mm×70 mm (Referential Example 1 and Example 2), and the dimensions of another sample were adjusted to 60 mm×100 mm (Referential Example 2, Example 5, Referential Example 4, Example 7, and Referential Examples 5 and 9). The former sample (30 mm×70 mm) was elongated with a chuck span of 30 mm at a tensile rate of 10 mm/min, and the latter sample (60 mm×100 mm) was elongated with a chuck span of 50 mm at a tensile rate of 10 mm/min, to thereby measure a strength at break. The measurement was repeated eight times, and the average (and the standard deviation) were calculated.

Humidity control (wet) conditions and enzyme treatment conditions are as described below.

(5) Post-Burial Treatment Tensile Strength (Example 3 (Processed Paper Prepared in Example 1)):

The measurement was performed with a constant rate elongation tensile tester (Autograph Tensile Tester, available from SHIMADZU CORPORATION) by the method according to JIS P8113:1998 "Paper and board—Determination of tensile properties—Part 2: Constant rate of elongation method." The dimensions of a sample were adjusted to 30 mm×70 mm. The sample was elongated with a chuck span of 30 mm at a tensile rate of 100 mm/min, to thereby measure a strength at break. The measurement was repeated four times, and the average (and the standard deviation) were calculated.

Burial treatment conditions are as described below.

(6) Enzyme Decay Resistance Index=[Post-Enzyme Treatment Tensile Strength/Wet Tensile Strength (Standard)]×100

Enzyme decay resistance index is an index showing decay resistance after enzyme treatment. In consideration of the effects of the present invention, a required index value (required strength) is generally 85 or more.

(7) Reference: Water Resistance Index=[Wet Tensile Strength/Dry Tensile Strength]×100

Water resistance index is a reference value used as an index for the quality control of a base paper.

<Example 1> Preparation of Processed Paper Through Citric Acid Treatment (1) [Non-Contact Thermal Treatment with Dryer]

Paper serving as a raw material (unbleached kraft paper (untreated with chemical): vinylon-mixed unbleached kraft pulp paper having a basis weight of 53 g/m², hereinafter referred to as "base paper") was immersed in a processing liquid containing citric acid (carboxylic acid crosslinking agent) and sodium hypophosphite (crosslinking catalyst) at concentrations shown in Table 1 for three minutes (temperature: ambient temperature (20° C. to 30° C.)). After completion of the immersion, the base paper was passed through a squeezing roller to thereby remove excess chemicals. The mass of the base paper was measured before and after immersion in the processing liquid, to thereby calculate the amount of the applied processing liquid (the amount of the processing liquid applied by immersion) and the amount of the active ingredient (the amount of citric acid) (see Table 2). The processing liquid applied to each test area had a pH of 2 or thereabouts.

Thereafter, the immersed base paper was dried with a drying roller, and then placed in a dryer set at 150° C. or 190° C. for three minutes. Thus, thermal drying treatment was performed in a state of non-contact with a heat source, to thereby prepare a processed paper with citric acid treatment (hereinafter referred to as "citric acid-processed paper").

As described in Example 4 below, the results of measurement of the mass of the base paper before and after immersion in the processing liquid indicated that the amount of the applied processing liquid and the amount of the active ingredient were comparable to those shown in Table 4 after the immersion (before the thermal treatment).

TABLE 1

Citric acid and sodium hypophosphite (concentrations)

| Test area | Citric acid concentration (% by mass) | Na hypophosphite concentration (% by mass) |
|---|---|---|
| 1 | 1.0 | 0.2 |
| 2 | 2.5 | 0.5 |
| 3 | 5.0 | 1.0 |
| 4 | 7.5 | 1.5 |
| 5 | 10.0 | 2.0 |
| 6 | 12.5 | 2.5 |
| 7 | 15.0 | 3.0 |

TABLE 2

Amounts of applied chemicals

| | | Amount of applied processing liquid (g/m²) | Amount of active ingredient* (g/m²) |
|---|---|---|---|
| Citric acid concentration (% by mass) | 1.0 | 55.9 | 0.56 |
| | 2.5 | 56.3 | 1.41 |
| | 5.0 | 57.0 | 2.85 |
| | 7.5 | 57.2 | 4.29 |
| | 10.0 | 58.2 | 5.82 |
| | 12.5 | 59.6 | 7.45 |
| | 15.0 | 59.6 | 8.95 |

*Amount of active ingredient corresponds to the amount of citric acid.

<Referential Example 1> Measurement of Wet Tensile Strength (Standard) (1)

Each of the citric acid-processed papers prepared in Example 1 (test areas 1 to 7, treatment temperature: 150° C. or 190° C.) was cut into a test sample having dimensions of 30 mm×70 mm. The test sample was immersed in water (room temperature: 20° C.±5° C.) for 24 hours, and then the wet tensile strength (standard) was measured through the procedure described in (4) above. The results are shown in Table 3 (Tables 3-1 and 3-2).

<Example 2> Measurement of Post-Enzyme Treatment Tensile Strength (1)

Each of the citric acid-processed papers prepared in Example 1 (test areas 1 to 7, treatment temperature: 150° C. or 190° C.) was cut into a test sample having dimensions of 30 mm×70 mm. The test sample was continuously treated for 72 hours in an incubator (45° C.) containing an enzyme liquid prepared so as to contain cellulase (Onozuka S, available from Yakult Pharmaceutical Industry Co., Ltd.) at a concentration of 1% and to have a pH of 5.0.

After completion of the treatment, the test sample was washed with water, and the post-enzyme treatment tensile strength was measured through the procedure described in (4) above.

The resultant post-enzyme treatment tensile strength and the wet tensile strength (standard) obtained in Referential Example 1 were used to calculate an enzyme decay resistance index by using the formula described in (6) above.

The results are shown in Table 3 (Tables 3-1 and 3-2).

<Example 3> Measurement of Post-Burial Treatment Tensile Strength

Each of the citric acid-processed papers prepared in Example 1 (test areas 1 to 7, treatment temperature: 150° C.

or 190° C.) was cut into a test sample having dimensions of 30 mm×70 mm. The test sample was buried in culture soil for vegetables (Super Baido, available from Nippon Beet Sugar Manufacturing Co., Ltd., pH: 6.74, EC: 1.81 dS/m) prepared so as to have a water content of 50%, and then allowed to stand still in an artificial meteorological device (available from Nippon Medical & Chemical Instruments Co., Ltd.) at a temperature of 30° C. and a humidity of 90%. The sample was removed from the soil after being allowed to stand still for two weeks or eight weeks. The post-burial treatment tensile strength was measured through the procedure described in (5) above. The results are shown in Table 3 (Tables 3-1 and 3-2).

treatment tensile strength was maintained at a certain level despite the progress of the degradation.

The post-enzyme treatment tensile strength increased with an increase in citric acid concentration, which indicates that citric acid suppresses degradation by soil microorganisms or degradation by cellulase. The results infer that a sufficient strength is maintained in soil when the citric acid concentration is 12.5% by mass or more.

As shown in Table 3-2 (thermal treatment: 190° C., three minutes), in the case of this treatment temperature, the wet tensile strength (standard) was maintained at an approximately constant level when the citric acid concentration was 2.5% by mass or more.

TABLE 3-1

Test results of processed paper prepared in Example 1 (non-contact thermal treatment)
Thermal treatment: 150° C., three minutes

| Citric acid concentration (% by mass) | Wet tensile strength (standard) (N/30 mm) | Post-burial treatment tensile strength (2 weeks) (N/30 mm) | Post-burial treatment tensile strength (8 weeks) (N/30 mm) | Post-enzyme treatment tensile strength (N/30 mm) | Enzyme decay resistance index |
|---|---|---|---|---|---|
| 1.0 | 13.8 ± 0.3 | 0.9 ± 0.4 | 1.2 ± 0.9 | — | — |
| 2.5 | 16.1 ± 3.1 | 1.2 ± 0.5 | 1.0 ± 0.3 | — | — |
| 5.0 | 21.3 ± 2.7 | 13.2 ± 6.7 | 2.1 ± 0.8 | 2.7 ± 0.4 | 13 |
| 7.5 | 27.4 ± 3.5 | 25.8 ± 2.0 | 6.8 ± 1.2 | 13.8 ± 5.2 | 50 |
| 10.0 | 31.9 ± 1.4 | 27.8 ± 1.7 | 7.3 ± 3.0 | 15.7 ± 7.6 | 49 |
| 12.5 | 29.2 ± 2.1 | 27.3 ± 1.7 | 14.8 ± 3.4 | 27.5 ± 1.6 | 94 |
| 15.0 | 33.1 ± 1.4 | 32.6 ± 5.5 | 20.4 ± 5.4 | 29.8 ± 3.8 | 90 |

TABLE 3-2

Test results of processed paper prepared in Example 1 (non-contact thermal treatment)
Thermal treatment: 190° C., three minutes

| Citric acid concentration (% by mass) | Wet tensile strength (standard) (N/30 mm) | Post-burial treatment tensile strength (2 weeks) (N/30 mm) | Post-burial treatment tensile strength (8 weeks) (N/30 mm) | Post-enzyme treatment tensile strength (N/30 mm) | Enzyme decay resistance index |
|---|---|---|---|---|---|
| 1.0 | 21.5 ± 1.0 | 6.4 ± 2.2 | 2.1 ± 0.4 | 5.3 ± 2.3 | 24 |
| 2.5 | 27.7 ± 2.8 | 19.0 ± 1.8 | 4.0 ± 0.6 | 20.4 ± 1.5 | 74 |
| 5.0 | 32.1 ± 4.4 | 31.1 ± 3.4 | 21.9 ± 5.3 | 31.3 ± 1.3 | 97 |
| 7.5 | 28.0 ± 6.0 | 30.6 ± 6.5 | 30.1 ± 1.2 | 38.2 ± 2.1 | 136 |
| 10.0 | 30.8 ± 3.8 | 36.2 ± 2.7 | 32.1 ± 2.8 | 36.6 ± 4.3 | 119 |
| 12.5 | 35.5 ± 4.0 | 34.5 ± 4.9 | 29.6 ± 6.2 | 39.0 ± 2.2 | 110 |
| 15.0 | 32.1 ± 3.4 | 34.5 ± 3.6 | 33.2 ± 6.2 | 37.4 ± 3.8 | 117 |

As shown in Table 3-1 (thermal treatment: 150° C., three minutes), the wet tensile strength (standard) tended to increase with an increase in citric acid concentration, and was maintained at an approximately constant level when the citric acid concentration was 7.5% by mass or more.

The tensile strength after two-week burial treatment was lower than the wet tensile strength (standard) when the citric acid concentration was 1.0 to 5.0% by mass; i.e., degradation of the sample proceeded. In contrast, when the citric acid concentration was 7.5 to 15.0% by mass, the post-burial treatment tensile strength was maintained at a certain level, and was comparable to the wet tensile strength (standard).

Meanwhile, the tensile strength after eight-week burial treatment was considerably reduced due to progress of the degradation of the sample when the citric acid concentration was 1.0 to 10.0% by mass. In contrast, when the citric acid concentration was 12.5% by mass or more, the post-burial The tensile strength after two-week burial treatment was reduced due to slight progress of the degradation of the sample when the citric acid concentration was 2.5% by mass or less. In contrast, when the citric acid concentration was 5.0% by mass or more, the degradation was suppressed, and the tensile strength was maintained at a certain level.

Meanwhile, the tensile strength after eight-week burial treatment was reduced (due to slight progress of the degradation) even when the citric acid concentration was 5.0% by mass or more. However, when the citric acid concentration was 7.5% by mass or more, the degradation was suppressed, and a sufficient strength was maintained.

The post-enzyme treatment tensile strength was maintained at a sufficient level due to suppression of the degradation, when the citric acid concentration was 5.0% by mass or more.

These results indicated that the treatment at this temperature suppresses cellulose degradation at a low citric acid concentration, as compared with the case of the treatment at 150° C.

<Example 4> Preparation of Processed Paper Through Citric Acid Treatment (2) [Contact Thermal Treatment with Heating Roller]

Paper serving as a raw material (unbleached kraft paper (untreated with chemical): vinylon-mixed unbleached kraft pulp paper having a basis weight of 53 g/m² (base paper)) was immersed in a processing liquid containing citric acid (crosslinking agent) and sodium hypophosphite (crosslinking catalyst) at concentrations shown in Table 1 above for three minutes (temperature: ambient temperature (20° C. to 30° C.)). After completion of the immersion, the base paper was passed through a squeezing roller to thereby remove excess chemicals. The mass of the base paper was measured before and after immersion in the processing liquid, to thereby calculate the amount of the applied processing liquid (the amount of the processing liquid applied by immersion) and the amount of the active ingredient (the amount of citric acid) (see Table 4). The processing liquid applied to each test area had a pH of 2 or thereabouts.

Thereafter, the immersed base paper was dried with a drying roller, and then subjected to contact thermal treatment with a heating roller set at 190° C. or 220° C. for 4.5 seconds, to thereby prepare a citric acid-processed paper.

For the sake of comparison, the base paper was treated in the same manner as described above with a dimethyldihydroxyethylene urea (DMDHEU)-containing agent (active ingredient: DMDHEU, concentration: 3.6% by mass), to thereby prepare a DMDHEU-crosslinked base paper. The DMDHEU-crosslinked base paper has been conventionally used as a base paper for a raising seedling pot.

Each of the citric acid-processed papers and the DMDHEU-crosslinked base paper prepared in Example 4 (treatment temperature: 190° C. or 220° C.) was subjected to the procedures (1) to (3) described above, to thereby calculate tear strength, folding strength, dry tensile strength and wet tensile strength, and water resistance index (by using the formula described in (7)).

The results are shown in Table 5 (Tables 5-1 and 5-2).

<Referential Example 2> Measurement of Wet Tensile Strength (Standard) (2)

Each of the citric acid-processed papers and the DMDHEU-crosslinked base paper prepared in Example 4 (treatment temperature: 190° C. or 220° C.) was cut into a test sample having dimensions of 60 mm×100 mm. The test sample was immersed in water (room temperature: 20° C.±5° C.) for 24 hours, and then the wet tensile strength (standard) was measured through the procedure described in (4) above. The results are shown in Table 5 (Tables 5-1 and 5-2).

<Example 5> Measurement of Post-Enzyme Treatment Tensile Strength (2)

Each of the citric acid-processed papers and the DMDHEU-crosslinked base paper prepared in Example 4 (treatment temperature: 190° C. or 220° C.) was cut into a test sample having dimensions of 60 mm×100 mm. The test sample was continuously treated for 72 hours in an incubator (45° C.) containing an enzyme liquid prepared so as to contain cellulase (Onozuka S, available from Yakult Pharmaceutical Industry Co., Ltd.) at a concentration of 1% and to have a pH of 5.0.

After completion of the treatment, the test sample was washed with water, and the post-enzyme treatment tensile strength was measured through the procedure described in (4) above.

The resultant post-enzyme treatment tensile strength and the wet tensile strength (standard) obtained in Referential

TABLE 4

Amounts of applied chemicals

|  |  |  | Amount of applied processing liquid (g/m²) | Amount of active ingredient* (g/m²) |
|---|---|---|---|---|
| Sample for 190° C. thermal treatment |  | DMDHEU-containing agent | 51.1 | 1.84 |
|  | Citric acid concentration (% by mass) | 1.0 | 50.9 | 0.51 |
|  |  | 2.5 | 51.7 | 1.29 |
|  |  | 5.0 | 52.8 | 2.64 |
|  |  | 7.5 | 54.3 | 4.07 |
|  |  | 10.0 | 54.4 | 5.44 |
|  |  | 12.5 | 55.6 | 6.95 |
|  |  | 15.0 | 56.4 | 8.46 |
| Sample for 220° C. thermal treatment |  | DMDHEU-containing agent | 52.3 | 1.88 |
|  | Citric acid concentration (% by mass) | 1.0 | 51.3 | 0.51 |
|  |  | 2.5 | 52.1 | 1.30 |
|  |  | 5.0 | 53.8 | 2.69 |
|  |  | 7.5 | 54.1 | 4.06 |
|  |  | 10.0 | 54.3 | 5.43 |
|  |  | 12.5 | 55.9 | 6.98 |
|  |  | 15.0 | 57.2 | 8.59 |

*Amount of active ingredient corresponds to the amount of citric acid (note: the amount of DMDHEU only in the case of DMDHEU-containing agent).

Each of the citric acid-processed papers and the DMDHEU-crosslinked base paper prepared in Example 4 (treatment temperature: Example 2 were used to calculate an enzyme decay resistance index by using the formula described in (6) above.

The results are shown in Table 5 (Tables 5-1 and 5-2).

TABLE 5-1

Test results of processed paper prepared in Example 4 (contact thermal treatment)
Thermal treatment: 190° C., 4.5 seconds

| | | Folding strength (number of times) | Tear strength (mN) | Dry tensile strength (N/15 mm) | Wet tensile strength (N/15 mm) | (Reference) Water resistance index | Wet tensile strength (standard) (N/60 mm) | Post-enzyme treatment tensile strength (N/60 mm) | Enzyme decay resistance index |
|---|---|---|---|---|---|---|---|---|---|
| Citric acid concentration (% by mass) | 1.0 | 147 ± 94 | 695 ± 36 | 50.7 ± 3.4 | 8.1 ± 0.5 | 16 | 31.2 ± 1.1 | — | — |
| | 2.5 | 97 ± 21 | 591 ± 39 | 50.3 ± 4.2 | 9.4 ± 0.9 | 19 | 35.3 ± 1.3 | — | — |
| | 5.0 | 61 ± 13 | 512 ± 25 | 49.2 ± 2.5 | 12.1 ± 1.0 | 25 | 48.0 ± 4.0 | — | — |
| | 7.5 | 31 ± 7 | 474 ± 33 | 50.6 ± 3.1 | 16.0 ± 1.1 | 32 | 64.9 ± 3.1 | — | — |
| | 10.0 | 23 ± 9 | 413 ± 11 | 48.9 ± 2.6 | 19.3 ± 1.3 | 40 | 75.9 ± 5.0 | — | — |
| | 12.5 | 20 ± 5 | 375 ± 12 | 45.3 ± 1.8 | 18.2 ± 2.7 | 40 | 82.2 ± 2.9 | — | — |
| | 15.0 | 15 ± 6 | 366 ± 8 | 45.4 ± 5.1 | 21.0 ± 0.9 | 36 | 85.0 ± 3.7 | 12.4 ± 2.8 | 15 |
| DMDHEU | | 40 ± 15 | 352 ± 12 | 56.4 ± 5.2 | 31.8 ± 1.6 | 56 | 126.5 ± 9.2 | 99.5 ± 3.4 | 79 |

TABLE 5-2

Test results of processed paper prepared in Example 4 (contact thermal treatment)
Thermal treatment: 220° C., 4.5 seconds

| | | Folding strength (number of times) | Tear strength (mN) | Dry tensile strength (N/15 mm) | Wet tensile strength (N/15 mm) | (Reference) Water resistance index | Wet tensile strength (standard) (N/60 mm) | Post-enzyme treatment tensile strength (N/60 mm) | Enzyme decay resistance index |
|---|---|---|---|---|---|---|---|---|---|
| Citric acid concentration (% by mass) | 1.0 | 100 ± 56 | 525 ± 29 | 49.5 ± 5.3 | 12.8 ± 0.7 | 26 | 50.2 ± 1.4 | — | — |
| | 2.5 | 41 ± 16 | 421 ± 13 | 49.1 ± 1.6 | 19.8 ± 1.8 | 40 | 73.9 ± 2.6 | 7.9 ± 1.4 | 11 |
| | 5.0 | 22 ± 6 | 360 ± 19 | 49.6 ± 1.5 | 27.0 ± 1.9 | 55 | 105.3 ± 4.2 | 57.9 ± 7.1 | 55 |
| | 7.5 | 10 ± 2 | 301 ± 11 | 52.0 ± 3.1 | 28.7 ± 3.3 | 55 | 114.1 ± 5.4 | 97.9 ± 2.8 | 86 |
| | 10.0 | 5 ± 2 | 280 ± 9 | 46.7 ± 4.2 | 26.8 ± 4.1 | 57 | 113.6 ± 8.1 | 103.5 ± 7.4 | 91 |
| | 12.5 | 4 ± 1 | 265 ± 6 | 47.6 ± 4.7 | 29.7 ± 2.3 | 62 | 111.6 ± 6.8 | 105.9 ± 4.1 | 95 |
| | 15.0 | 2 ± 1 | 248 ± 11 | 44.2 ± 7.7 | 27.9 ± 2.0 | 63 | 114.2 ± 9.4 | 101.2 ± 4.4 | 89 |
| DMDHEU | | 6 ± 2 | 250 ± 8 | 52.5 ± 3.1 | 38.1 ± 2.9 | 73 | 138.6 ± 14.6 | 128.4 ± 8.6 | 93 |

As shown in Table 5-1 (thermal treatment: 190° C., 4.5 seconds), the enzyme treatment resulted in considerable progress of degradation at all citric acid concentrations, and the post-enzyme treatment tensile strength was not measured in almost all the samples. The results indicated that the treatment at 190° C. is not satisfactory for achieving the target performance.

The folding strength (number of times) and the tear strength decreased with an increase in citric acid concentration, and were comparable to those in the DMDHEU-crosslinked base paper when the citric acid concentration was 10% by mass or more.

The dry tensile strength almost remained unchanged regardless of citric acid concentration, but was about 10% lower than that in the DMDHEU-crosslinked base paper. The wet tensile strength increased with an increase in citric acid concentration, but was about 30% lower than that in the DMDHEU-crosslinked base paper even when the citric acid concentration was maximum (i.e., 15% by mass).

As shown in Table 5-2 (thermal treatment: 220° C., 4.5 seconds), in the case of this treatment temperature, when the citric acid concentration was 7.5% by mass or more, the wet tensile strength (standard) was comparable to that in the DMDHEU-crosslinked base paper (i.e., obtained suppressed degradation and sufficient strength), and the enzyme decay resistance index was comparable to that in the DMDHEU-crosslinked base paper.

The folding strength (number of times) and the tear strength decreased with an increase in citric acid concentration, and were comparable to those in the DMDHEU-crosslinked base paper when the citric acid concentration was 7.5% by mass or more.

The dry tensile strength almost remained unchanged regardless of citric acid concentration, and tended to be slightly lower than that in the DMDHEU-crosslinked base paper. The wet tensile strength increased with an increase in citric acid concentration, and was about 30% lower than that in the DMDHEU-crosslinked base paper when the citric acid concentration was maximum (i.e., 15% by mass).

These results indicated that, in the case of the treatment at 220° C., when the citric acid concentration is 7.5% by mass or more, sufficient decay resistance can be provided although the wet tensile strength is slightly lower than that in the DMDHEU-crosslinked base paper.

<Example 6> Preparation of Processed Paper through Citric Acid Treatment (3) [Contact Thermal Treatment with Heating Roller]

<Citric acid-treated area>

Paper serving as a raw material (unbleached kraft paper (untreated with chemical): hemp-mixed unbleached kraft pulp paper having a basis weight of 53 g/m², hereinafter referred to as "base paper 2") was immersed in a processing liquid containing citric acid (carboxylic acid crosslinking agent) and sodium hypophosphite (crosslinking catalyst) at concentrations shown in Table 6 below for three minutes (temperature: ambient temperature (20° C. to 30° C.)). After completion of the immersion, the base paper 2 was passed through a squeezing roller to thereby remove excess chemicals. The mass of the base paper 2 was measured before and after immersion in the processing liquid, to thereby calculate the amount of the applied processing liquid (the amount of the processing liquid applied by immersion) and the amount of the active ingredient (the amount of citric acid) (see Table 6).

Thereafter, the immersed base paper 2 was dried with a drying roller, and then subjected to contact thermal treatment with a heating roller set at 220° C. for 4.5 seconds, to thereby prepare a citric acid-processed paper.

For the sake of comparison, the following treated areas were provided.

<Untreated Area>

The base paper 2 was used as is without citric acid treatment.

<DMDHEU-Treated Area>

In the same manner as in the aforementioned citric acid treatment, the base paper 2 was treated with a dimethyldihydroxyethylene urea (DMDHEU)-containing agent (active ingredient: DMDHEU, concentration: 3.6% by mass), to thereby prepare a DMDHEU-crosslinked base paper. Table 7 shows the amount of the applied processing liquid (the amount of the processing liquid applied by immersion) and the amount of the active ingredient (the amount of DMDHEU).

TABLE 6

Citric acid and sodium hypophosphite (concentrations and amounts of applied chemicals)

| Citric acid concentration (% by mass) | Na hypophosphite concentration (% by mass) | Amount of applied processing liquid (g/m$^2$) | Amount of active ingredient* (g/m$^2$) |
|---|---|---|---|
| 5.0 | 1.0 | 64.6 | 3.23 |
| 7.5 | 1.5 | 65.2 | 4.89 |
| 10.0 | 2.0 | 66.2 | 6.62 |

*Amount of active ingredient corresponds to the amount of citric acid.

TABLE 7

DMDHEU-containing agent (amount of applied chemical)

| Amount of applied processing liquid (g/m$^2$) | Amount of active ingredient* (g/m$^2$) |
|---|---|
| 64.3 | 2.31 |

*Amount of active ingredient corresponds to the amount of DMDHEU.

Each of the citric acid-processed papers and the DMDHEU-crosslinked base paper prepared in Example 6 was subjected to the procedures (1) to (3) described above, to thereby calculate tear strength, folding strength, dry tensile strength and wet tensile strength, and water resistance index (by using the formula described in (7)). The results are shown in Table 8 (Table 8-1 (paper length direction (longitudinal direction)) and Table 8-2 (paper width direction (lateral direction))). Table 8 also shows the pH of each processing liquid.

Referential Example 3

Measurement of Fourier Transform Infrared Spectroscopy (FT-IR) Spectra A measurement sample for FT-IR was collected from each <citric acid-treated area> shown in Example 6 before and after the contact thermal treatment (220° C.) of the citric acid-treated area. The sample was washed with water for 10 minutes and then washed with hot water of 70° C. for 10 minutes. Thereafter, the sample was dried at ambient temperature, and the FT-IR spectra of the sample were measured with a Fourier transform infrared spectrophotometer (FT/IR-4600 type A, available from JASCO Corporation). The FT-IR spectra of the base paper 2 corresponding to <untreated area> were measured through the same procedure as described above. The results are shown in FIGS. 1 to 7.

Referential Example 4

Measurement of Wet Tensile Strength (Standard) (3)

Each of the citric acid-processed papers and the DMDHEU-crosslinked base paper prepared in Example 6 was cut into a test sample having dimensions of 60 mm×100 mm. The test sample was immersed in water (room temperature: 20° C.±5° C.) for 24 hours, and then the wet tensile strength (standard) was measured through the procedure described in (4) above.

The results are shown in Table 8 (Table 8-1 (paper length direction (longitudinal direction)) and Table 8-2 (paper width direction (lateral direction))).

<Example 7> Measurement of Post-Enzyme Treatment Tensile Strength (3)

Each of the citric acid-processed papers and the DMDHEU-crosslinked base paper prepared in Example 6 was cut into a test sample having dimensions of 60 mm×100 mm. The test sample was continuously treated for 72 hours in an incubator (45° C.) containing an enzyme liquid prepared so as to contain cellulase (Onozuka S, available from Yakult Pharmaceutical Industry Co., Ltd.) at a concentration of 1% and to have a pH of 5.0. After completion of the treatment, the test sample was washed with water, and the post-enzyme treatment tensile strength was measured through the procedure described in (4) above.

The resultant post-enzyme treatment tensile strength and the wet tensile strength (standard) obtained in Referential Example 4 were used to calculate an enzyme decay resistance index by using the formula described in (6) above.

The results are shown in Table 8 (Table 8-1 (paper length direction (longitudinal direction)) and Table 8-2 (paper width direction (lateral direction))).

TABLE 8-1

Test results of processed paper prepared in Example 6 (contact thermal treatment) (paper length direction (longitudinal direction))
Thermal treatment: 220° C., 4.5 seconds, paper length direction (longitudinal direction)

|  |  | Processing liquid PH | Folding strength (number of times) | Tear strength (mN) | Dry tensile strength (N/15 mm) | Wet tensile strength (N/15 mm) | (Reference) Water resistance index | Wet tensile strength (standard) (N/60 mm) | Post-enzyme treatment tensile strength (N/60 mm) | Enzyme decay resistance index |
|---|---|---|---|---|---|---|---|---|---|---|
| DMDHEU |  | 4.4 | 4 ± 2 | 166 ± 9 | 59.1 ± 9.1 | 49.3 ± 3.0 | 83 | 157.7 ± 14.5 | 141.1 ± 16.3 | 89 |
| *Citric | 5.0 | 2.0 | 20 ± 4 | 160 ± 14 | 58.3 ± 8.0 | 28.3 ± 5.0 | 49 | 114.1 ± 8.8 | 56.7 ± 13.8 | 50 |
| acid | 7.5 | 2.0 | 4 ± 1 | 226 ± 48 | 54.9 ± 4.7 | 33.9 ± 2.6 | 62 | 135.2 ± 3.5 | 90.1 ± 22.7 | 67 |
|  | 10.0 | 1.9 | 1 ± 0 | 155 ± 8 | 52.5 ± 6.1 | 33.0 ± 6.5 | 63 | 131.9 ± 18.5 | 112.0 ± 8.2 | 85 |

*Citric acid concentration (% by mass)

TABLE 8-2

Test results of processed paper prepared in Example 6 (contact thermal treatment) (paper width direction (lateral direction))
Thermal treatment: 220° C., 4.5 seconds, paper width direction (lateral direction)

|  |  | Processing liquid PH | Folding strength (number of times) | Tear strength (mN) | Dry tensile strength (N/15 mm) | Wet tensile strength (N/15 mm) | (Reference) Water resistance index | Wet tensile strength (standard) (N/60 mm) | Post-enzyme treatment tensile strength (N/60 mm) | Enzyme decay resistance index |
|---|---|---|---|---|---|---|---|---|---|---|
| DMDHEU |  | 4.4 | 4 ± 3 | 219 ± 10 | 30.1 ± 1.8 | 18.6 ± 3.2 | 62 | 76.7 ± 4.8 | 71.9 ± 3.6 | 94 |
| *Citric | 5.0 | 2.0 | 11 ± 2 | 315 ± 15 | 26.0 ± 2.5 | 13.9 ± 0.3 | 53 | 50.9 ± 4.8 | 24.8 ± 2.6 | 49 |
| acid | 7.5 | 2.0 | 5 ± 1 | 238 ± 10 | 26.4 ± 2.3 | 15.6 ± 1.1 | 59 | 62.9 ± 3.2 | 48.1 ± 5.9 | 76 |
|  | 10.0 | 1.9 | 2 ± 1 | 212 ± 11 | 26.1 ± 2.2 | 16.4 ± 0.8 | 63 | 61.4 ± 3.4 | 50.0 ± 2.1 | 81 |

*Citric acid concentration (% by mass)

As shown in Table 8 (Tables 8-1 and 8-2), the citric acid-processed papers exhibited reduced physical strength and increased enzyme decay resistance index with an increase in citric acid concentration. When the citric acid concentration was 10.0% by mass, the physical strength was comparable to that in the DMDHEU-crosslinked base paper.

Figure 2:
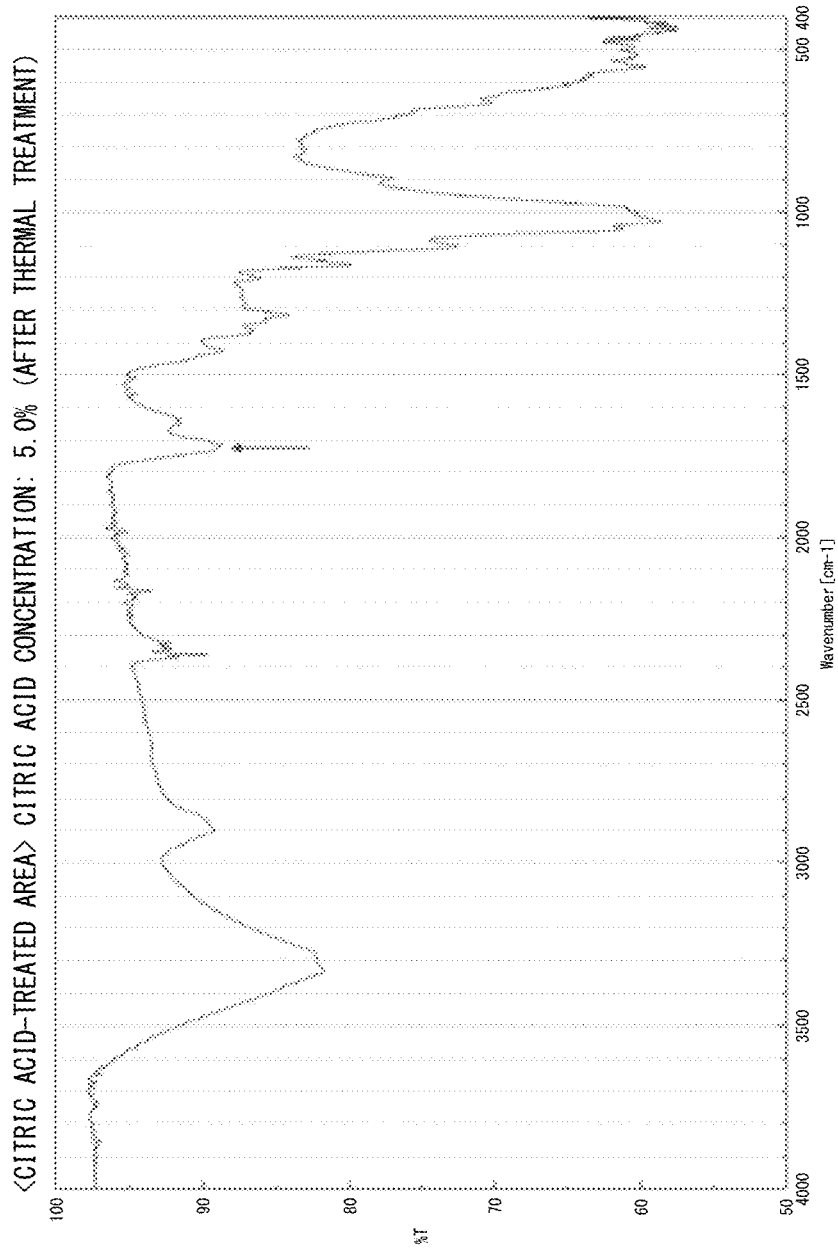
FIG. 2 shows the results of FT-IR spectroscopy performed on a citric acid-processed paper sample collected at <citric acid-treated area> (citric acid concentration: 5.0%) after thermal treatment.
Figure 3:
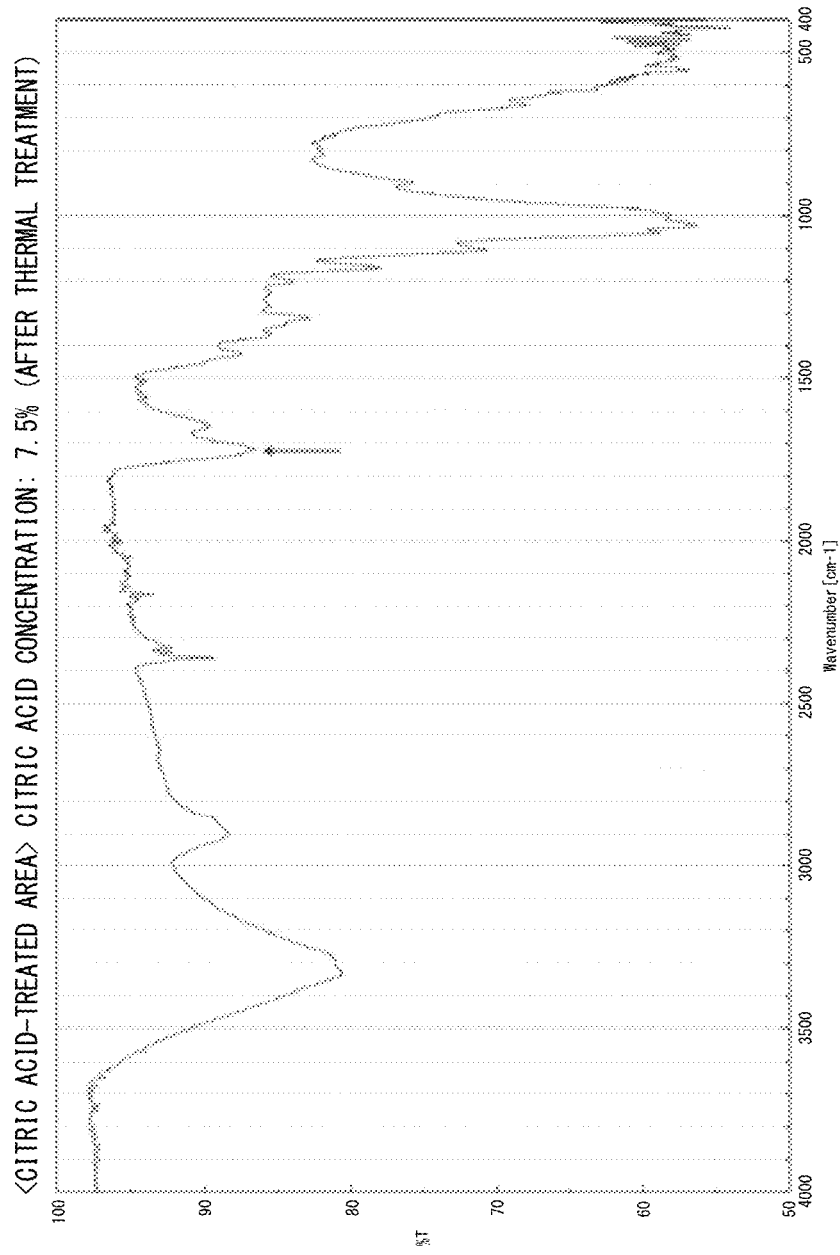
FIG. 3 shows the results of FT-IR spectroscopy performed on a citric acid-processed paper sample collected at <citric acid-treated area> (citric acid concentration: 7.5%) after thermal treatment.
Figure 4:
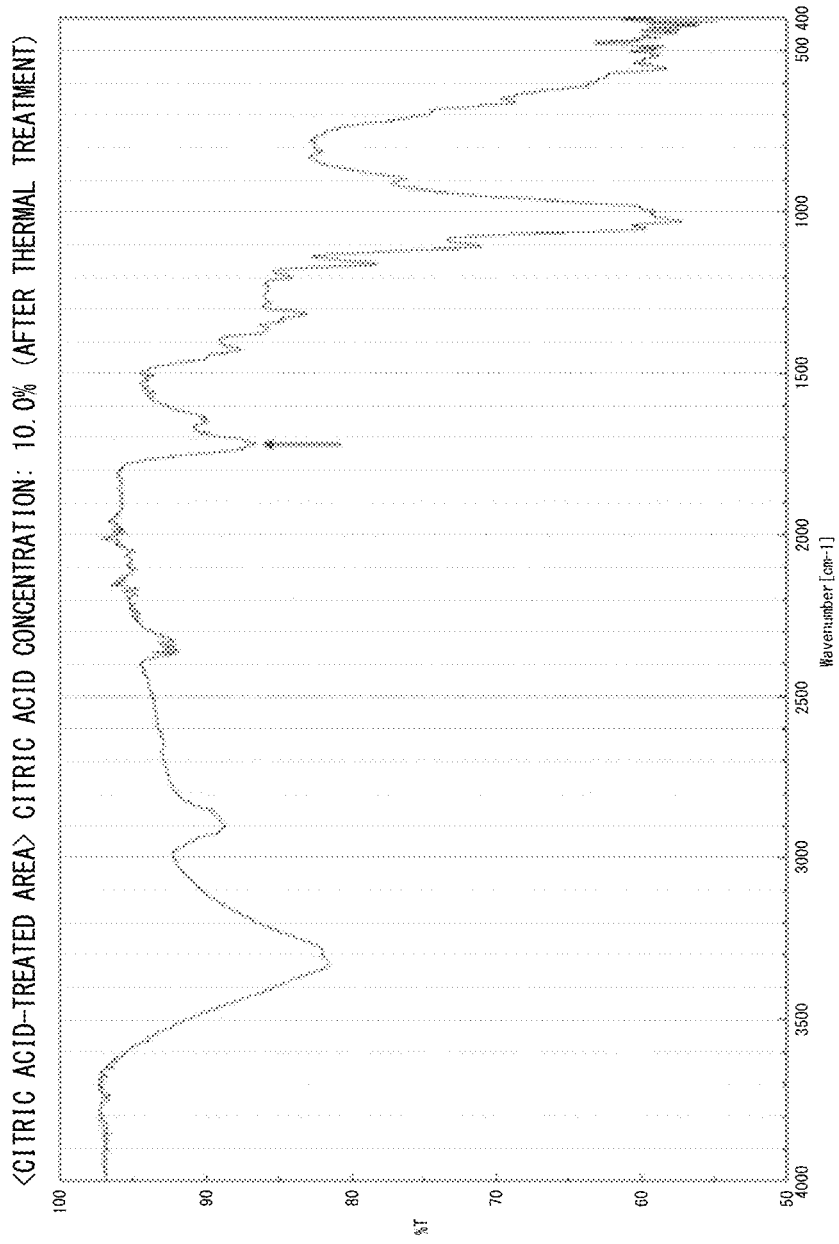
FIG. 4 shows the results of FT-IR spectroscopy performed on a citric acid-processed paper sample collected at <citric acid-treated area> (citric acid concentration: 10.0%) after thermal treatment.
Figure 5:
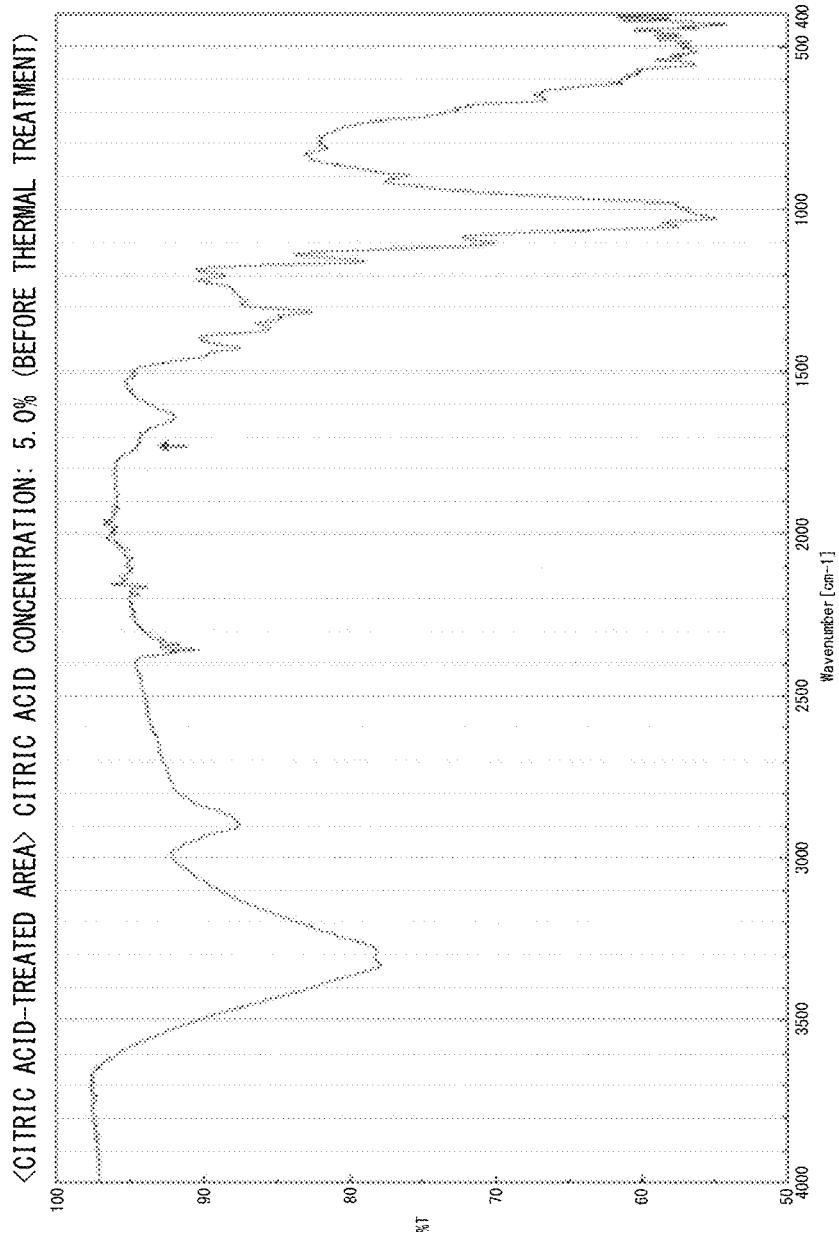
FIG. 5 shows the results of FT-IR spectroscopy performed on a citric acid-processed paper sample collected at <citric acid-treated area> (citric acid concentration: 5.0%) before thermal treatment.
Figure 6:
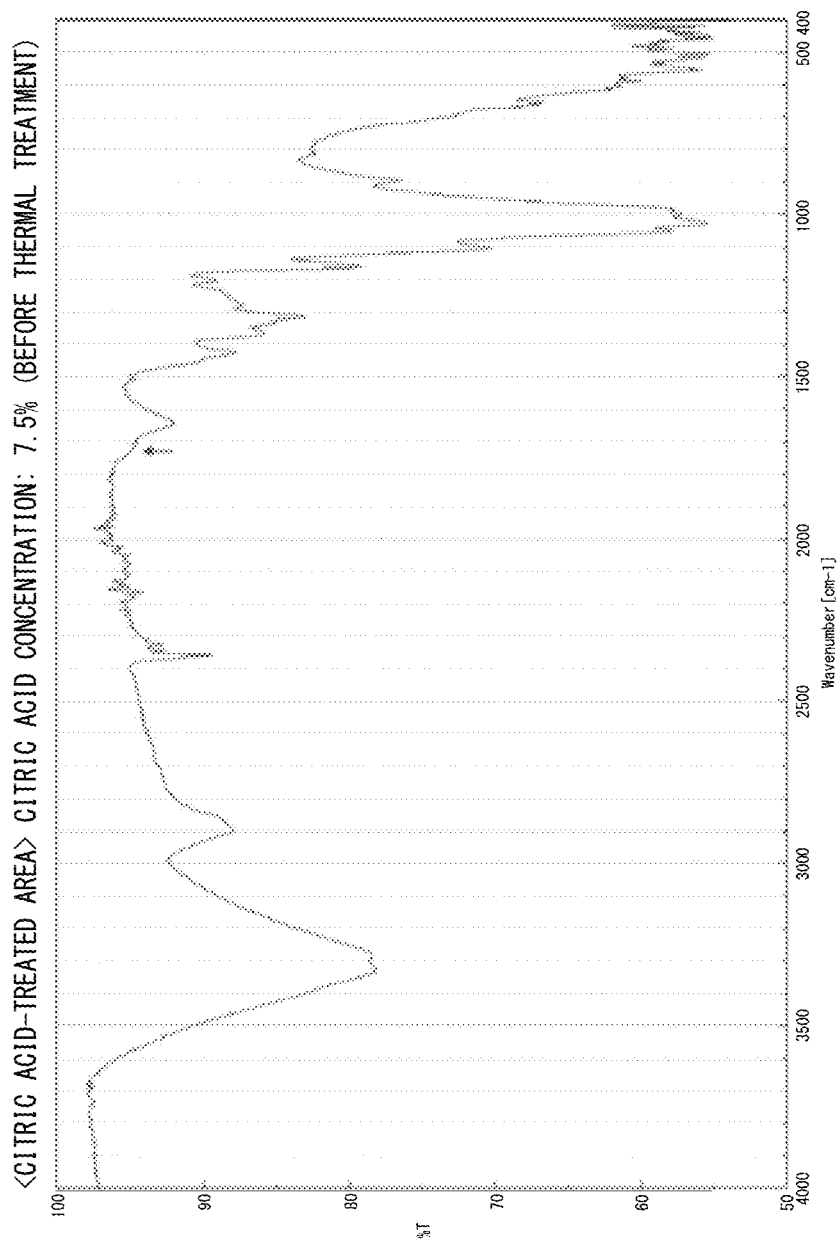
FIG. 6 shows the results of FT-IR spectroscopy performed on a citric acid-processed paper sample collected at <citric acid-treated area> (citric acid concentration: 7.5%) before thermal treatment.
Figure 7:
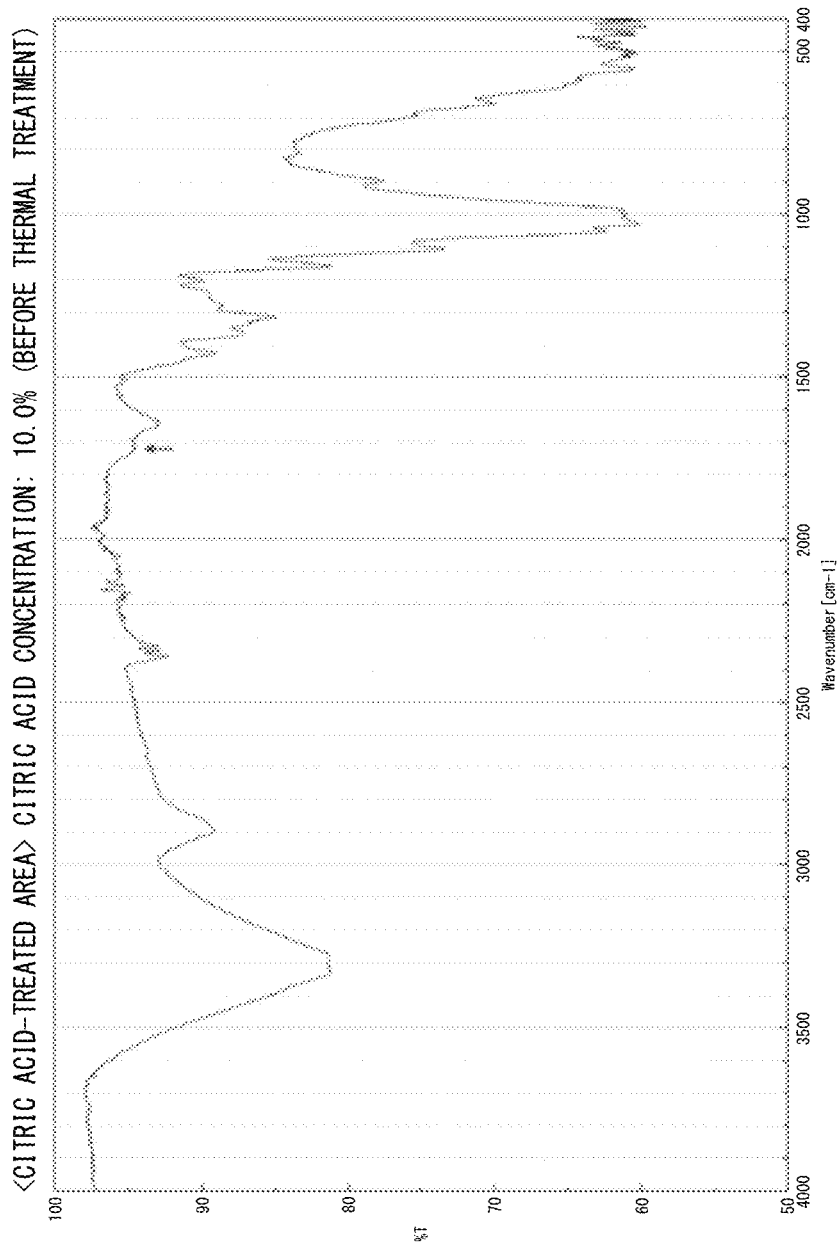
FIG. 7 shows the results of FT-IR spectroscopy performed on a citric acid-processed paper sample collected at <citric acid-treated area> (citric acid concentration: 10.0%) before thermal treatment.

As shown in FT-IR spectra of FIGS. 1 to 7, the comparison of spectrum waveforms in each treated area between before and after the thermal treatment indicated that the peak attributed to the C=O stretching vibration of an ester was observed at a wavenumber of around 1,700 to 1,750 cm-1 (see the peak shown by an arrow in the figure) after the thermal treatment in the sample of the citric acid-treated area (citric acid concentration: 5.0% by mass, 7.5% by mass, or 10.0% by mass); i.e., a crosslinked structure was introduced (FIG. 2: citric acid concentration of 5.0% by mass, FIG. 3: citric acid concentration of 7.5% by mass, FIG. 4: citric acid concentration of 10.0% by mass).

In contrast, in the untreated area (FIG. 1), no peak is observed at around the aforementioned wavenumber; i.e., a crosslinked structure is not introduced.

Slight peaks are observed at around the aforementioned wavenumber in the citric acid-treated samples before the thermal treatment (citric acid concentration: 5.0% by mass (FIG. 5): citric acid concentration: 7.5% by mass (FIG. 6), citric acid concentration: 10.0% by mass (FIG. 7)). Conceivably, this is attributed to the fact that crosslinking reaction slightly proceeded through thermal addition during a drying operation after application of the agent.

<Example 8> Preparation of Processed Paper through Citric Acid Treatment (4) [Contact Thermal Treatment with Heating Roller]

<Citric acid-treated area>

A solution containing citric acid (carboxylic acid crosslinking agent) (300 g/L) and sodium hypophosphite (crosslinking catalyst) (60 g/L) was provided, and sodium hydroxide was added to the solution, to thereby adjust the pH of the solution to 2, 3, 4, 5, or 6. The pH-adjusted solution was diluted by a factor of 2.5 to thereby prepare a processing liquid. Paper serving as a raw material (unbleached kraft paper (untreated with chemical): hemp-mixed unbleached kraft pulp paper having a basis weight of 53 g/m$^2$, hereinafter referred to as "base paper 2") was immersed in the processing liquid for three minutes (temperature: ambient temperature (20° C. to 30° C.)). After completion of the immersion, the base paper 2 was passed through a squeezing roller to thereby remove excess chemicals. The mass of the base paper 2 was measured before and after immersion in the processing liquid, to thereby calculate the amount of the applied processing liquid (the amount of the processing liquid applied by immersion) and the amount of the active ingredient (the amount of citric acid) (see Table 9). In this case, the citric acid concentration was 12.0% by mass, and the sodium hypophosphite concentration was 2.4% by mass.

Thereafter, the immersed base paper 2 was dried with a drying roller, and then subjected to contact thermal treatment with a heating roller set at 220° C. for 4.5 seconds, to thereby prepare a citric acid-processed paper.

<DMDHEU-treated area>

In the same manner as in the aforementioned citric acid treatment, the base paper 2 was treated with a dimethyldihydroxyethylene urea (DMDHEU)-containing agent (active ingredient: DMDHEU, concentration: 3.6% by mass), to thereby prepare a DMDHEU-crosslinked base paper. Table 9 shows the amount of the applied processing liquid (the amount of the processing liquid applied by immersion) and the amount of the active ingredient (the amount of DMDHEU).

TABLE 9

| | Amount of applied processing liquid (g/m²) | Amount of active ingredient* (g/m²) |
|---|---|---|
| DMDHEU-containing agent | 63.8 | 2.30 |
| Citric acid treatment pH 2 | 66.4 | 7.97 |
| pH 3 | 62.4 | 7.48 |
| pH 4 | 65.8 | 7.89 |
| pH 5 | 67.8 | 8.14 |
| pH 6 | 68.8 | 8.25 |

*Amount of active ingredient corresponds to the amount of citric acid (note: the amount of DMDHEU only in the case of DMDHEU-containing agent).

Each of the citric acid-processed papers and the DMDHEU-crosslinked base paper prepared in Example 8 was subjected to the procedures (1) to (3) described above, to thereby calculate tear strength, folding strength, dry tensile strength and wet tensile strength, and water resistance index (by using the formula described in (7)).

The results are shown in Table 10 (Table 10-1 (paper length direction (longitudinal direction)) and Table 10-2 (paper width direction (lateral direction))). Table 10 also shows the pH of each processing liquid.

Referential Example 5

Measurement of Wet Tensile Strength (Standard) (4)

Each of the citric acid-processed papers and the DMDHEU-crosslinked base paper prepared in Example 8 was cut into a test sample having dimensions of 60 mm×100 mm. The test sample was immersed in water (room temperature: 20° C.±5° C.) for 24 hours, and then the wet tensile strength (standard) was measured through the procedure described in (4) above.

The results are shown in Table 10 (Table 10-1 (paper length direction (longitudinal direction)) and Table 10-2 (paper width direction (lateral direction))).

<Example 9> Measurement of Post-Enzyme Treatment Tensile Strength (4)

Each of the citric acid-processed papers and the DMDHEU-crosslinked base paper prepared in Example 8 was cut into a test sample having dimensions of 60 mm×100 mm. The test sample was continuously treated for 72 hours in an incubator (45° C.) containing an enzyme liquid prepared so as to contain cellulase (Onozuka S, available from Yakult Pharmaceutical Industry Co., Ltd.) at a concentration of 1% and to have a pH of 5.0.

After completion of the treatment, the test sample was washed with water, and the post-enzyme treatment tensile strength was measured through the procedure described in (4) above.

The resultant post-enzyme treatment tensile strength and the wet tensile strength (standard) obtained in Referential Example 5 were used to calculate an enzyme decay resistance index by using the formula described in (6) above.

The results are shown in Table 10 (Table 10-1 (paper length direction (longitudinal direction)) and Table 10-2 (paper width direction (lateral direction))).

TABLE 10-1

Test results of processed paper prepared in Example 8 (contact thermal treatment) (paper length direction (longitudinal direction))
Thermal treatment: 220° C., 4.5 seconds, paper length direction (longitudinal direction)

| | Processing liquid PH | Folding strength (number of times) | Tear strength (mN) | Dry tensile strength (N/15 mm) | Wet tensile strength (N/15 mm) | (Reference) Water resistance index | Wet tensile strength (standard) (N/60 mm) | Post-enzyme treatment tensile strength (N/60 mm) | Enzyme decay resistance index |
|---|---|---|---|---|---|---|---|---|---|
| DMDHEU | 4.4 | 4 ± 2 | 166 ± 9 | 59.1 ± 9.1 | 49.3 ± 3.0 | 83 | 157.7 ± 14.5 | 141.1 ± 16.3 | 89 |
| *Citric acid treatment | 2.0 | 2 ± 1 | 139 ± 19 | 60.7 ± 3.0 | 39.3 ± 4.1 | 65 | 153.6 ± 7.5 | 123.3 ± 19.0 | 80 |
| | 3.0 | 4 ± 2 | 180 ± 14 | 60.1 ± 11.8 | 41.6 ± 3.5 | 69 | 155.5 ± 16.1 | 131.4 ± 6.8 | 85 |
| | 4.0 | 86 ± 47 | 195 ± 5 | 66.4 ± 7.9 | 30.1 ± 2.3 | 45 | 106.5 ± 6.7 | 13.7 ± 6.2 | 13 |
| | 5.0 | 281 ± 53 | 341 ± 30 | 62.1 ± 1.8 | 8.5 ± 0.4 | 14 | 25.6 ± 5.1 | 0.0 ± 0.0 | 0 |
| | 6.0 | 582 ± 69 | 789 ± 35 | 59.7 ± 2.3 | 3.9 ± 0.3 | 7 | 12.6 ± 0.7 | 0.0 ± 0.0 | 0 |

*Citric acid concentration: 12.0% by mass

TABLE 10-2

Test results of processed paper prepared in Example 8 (contact thermal treatment) (paper width direction (lateral direction))
Thermal treatment: 220° C., 4.5 seconds, paper width direction (lateral direction)

| | Processing liquid PH | Folding strength (number of times) | Tear strength (mN) | Dry tensile strength (N/15 mm) | Wet tensile strength (N/15 mm) | (Reference) Water resistance index | Wet tensile strength (standard) (N/60 mm) | Post-enzyme treatment tensile strength (N/60 mm) | Enzyme decay resistance index |
|---|---|---|---|---|---|---|---|---|---|
| DMDHEU | 4.4 | 4 ± 3 | 219 ± 10 | 30.1 ± 1.8 | 18.6 ± 3.2 | 62 | 76.7 ± 4.8 | 71.9 ± 3.6 | 94 |
| *Citric acid treatment | 2.0 | 1 ± 1 | 200 ± 10 | 25.9 ± 2.0 | 19.8 ± 1.6 | 77 | 71.3 ± 3.9 | 62.8 ± 3.4 | 88 |
| | 3.0 | 9 ± 5 | 296 ± 14 | 25.8 ± 2.4 | 17.3 ± 0.9 | 67 | 69.7 ± 4.4 | 57.8 ± 4.4 | 83 |
| | 4.0 | 26 ± 6 | 372 ± 17 | 30.6 ± 0.6 | 12.7 ± 1.2 | 42 | 47.2 ± 3.2 | 9.5 ± 1.9 | 20 |
| | 5.0 | 54 ± 8 | 463 ± 26 | 24.8 ± 1.5 | 3.7 ± 0.2 | 15 | 13.0 ± 1.1 | 0.0 ± 0.0 | 0 |
| | 6.0 | 108 ± 39 | 578 ± 57 | 23.7 ± 1.5 | 1.5 ± 0.1 | 7 | 6.1 ± 0.4 | 0.0 ± 0.0 | 0 |

*Citric acid concentration: 12.0% by mass

As shown in Table 10 (Tables 10-1 and 10-2), the folding strength in the citric acid-processed paper (processing liquid pH: 2 or 3) was comparable to that in the DMDHEU-crosslinked base paper regardless of the paper direction. However, the folding strength in the citric acid-processed paper increased with an increase in processing liquid pH (i.e., pH of 4, 5, or 6).

The tear strength in the citric acid-processed paper (processing liquid pH: 2) was somewhat lower than that in the DMDHEU-crosslinked base paper regardless of the paper direction. However, the tear strength in the citric acid-processed paper (processing liquid pH: 3, 4, 5, or 6) was higher than that in the DMDHEU-crosslinked base paper. Thus, the tear strength tended to increase with an increase in processing liquid pH.

The dry tensile strength maintained almost constant in all samples regardless of the processing liquid pH and the paper direction. Meanwhile, the wet tensile strength in the citric acid-processed paper (processing liquid pH: 2 or 3) was comparable to that in the DMDHEU-crosslinked base paper regardless of the paper direction, and the wet tensile strength in the citric acid-processed paper decreased with an increase in processing liquid pH (i.e., pH of 4, 5, or 6).

Regardless of the paper direction, the wet tensile strength and the post-enzyme treatment tensile strength in the citric acid-processed paper (processing liquid pH: 2 or 3) were maintained at a certain level, although slightly lower than those in the DMDHEU-crosslinked base paper. However, these strengths in the citric acid-processed paper decreased with an increase in processing liquid pH (i.e., pH of 4, 5, or 6).

These results indicated that when the base paper is treated with citric acid in a processing liquid having a more acidic pH (for example, the pH is adjusted to less than 4 in the case of a processing liquid having a citric acid concentration of 12.0% by mass), crosslinking reaction proceeds sufficiently, and the resultant citric acid-processed paper exhibits physical strength and decay resistance comparable to those in the DMDHEU-crosslinked base paper.

The invention claimed is:

1. A raising seedling pot made of a base paper for a raising seedling pot comprising a decay-resistant paper that comprises a cellulose fiber-containing paper and a carboxylic acid crosslinking agent, wherein the cellulose fiber is at least partially bonded to the carboxylic acid crosslinking agent, the carboxylic acid crosslinking agent is at least one compound selected from the group consisting of citric acid, iminodisuccinic acid, maleic acid, fumaric acid, oxalic acid, malonic acid, succinic acid, adipic acid, and salts of these, and the carboxylic acid crosslinking agent is contained in an amount of 7.5 to 20.0% by mass relative to the dry mass of the decay-resistant paper, wherein a crosslinking catalyst is contained in an amount of 10 to 30% by mass relative to the mass of the carboxylic acid crosslinking agent, an enzyme decay resistance index is calculated by [post-enzyme treatment tensile strength/wet tensile strength (standard)]×100 and the enzyme decay resistance index for the base paper for a raising seedling pot is 85 or more, the wet tensile strength (standard) is measured as follows: the humidity of a test sample of the decay-resistant paper is controlled by the method specified by JIS P8111:1998 (standard atmosphere for conditioning: 23° C.±1° C., (50±2)% r. h.); the test sample is then immersed in water (temperature: 20° C.±5° C.) for 24 hours; and the test sample is measured by the method according to JIS P8113:1998 "Paper and board—Determination of tensile properties—Part 2: Constant rate of elongation method", and the post-enzyme treatment tensile strength is measured as follows: a test sample of the decay-resistant paper is continuously treated for 72 hours in an incubator (45° C.) containing an enzyme liquid prepared so as to contain cellulase at a concentration of 1% and to have a pH of 5.0; after completion of the treatment, the test sample is washed with water; and the test sample is measured by the method according to JIS P8113:1998 "Paper and board—Determination of tensile properties—Part 2: Constant rate of elongation method".

2. The raising seedling pot according to claim 1, wherein the carboxylic acid crosslinking agent is citric acid.

3. The raising seedling pot according to claim 1, wherein the crosslinking catalyst is at least one selected from the group consisting of sodium hypophosphite, potassium hypophosphite, and disodium hydrogenphosphate.

* * * * *